Relationship Between Apparent Density of Manganese Dioxide Precipitate and the pH Value.

Relationship of the Discharge Capacity and the Cell Voltage of a Le Clanché Cell depending on the drying temperature of the Manganese Dioxide used.

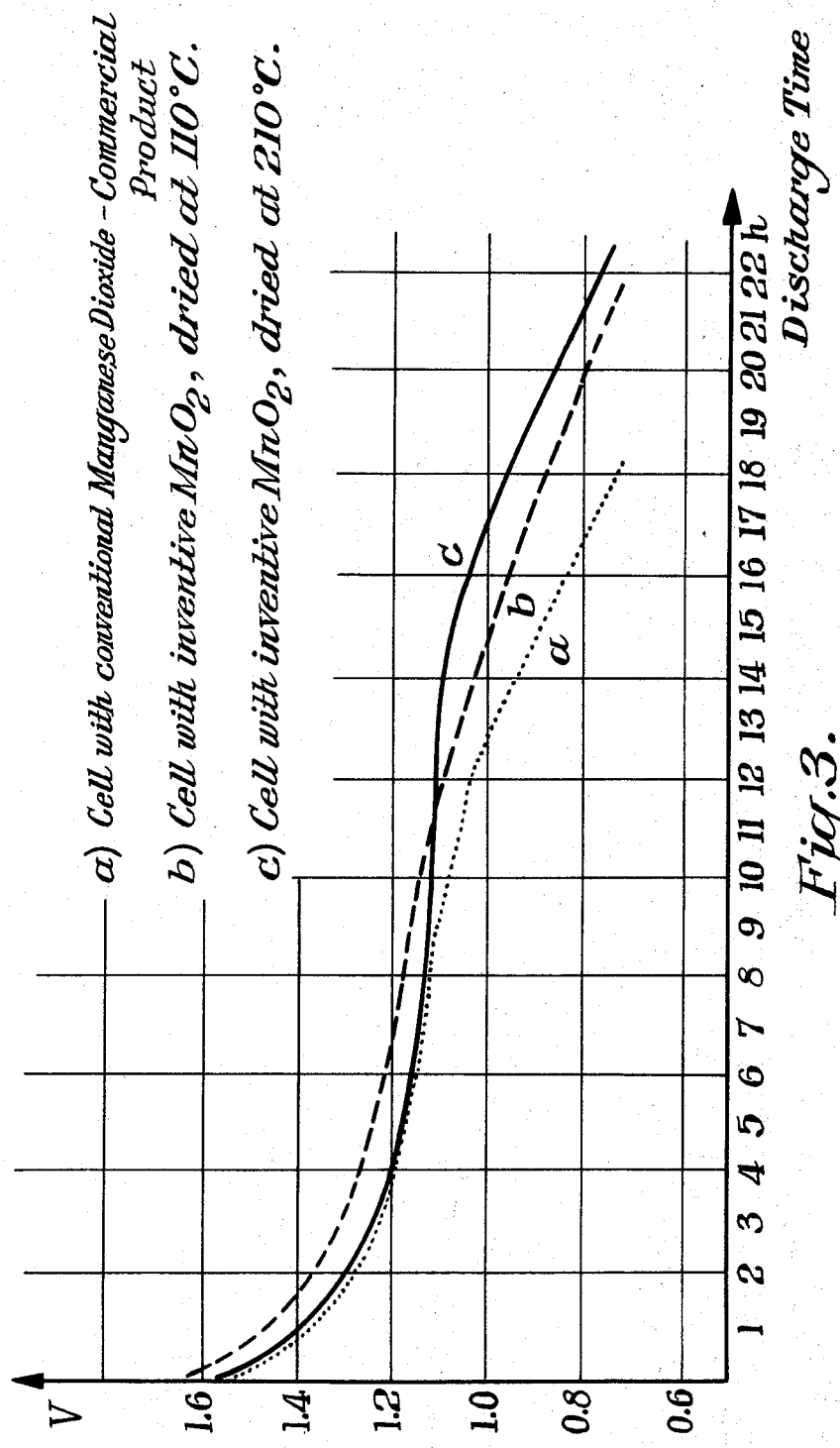

United States Patent Office 3,773,916
Patented Nov. 20, 1973

3,773,916
PROCESS FOR THE MANUFACTURE OF
ARTIFICIAL MANGANESE DIOXIDE
Eberhard Preisler, Hurth-Knapsack, Kurt Grapentin, Cologne-Zollstock, Heinz Harnisch, Lovenich, and Gerhard Mietens, Hurth-Efferen, Germany, assignors to Knapsack Aktiengesellschaft, Knapsack, near Cologne, Germany
Filed Jan. 26, 1972, Ser. No. 220,906
Claims priority, application Germany, Jan. 29, 1971, P 21 04 127.0
Int. Cl. C01g 45/02
U.S. Cl. 423—605    10 Claims

ABSTRACT OF THE DISCLOSURE

Production of artificial manganese dioxide by intensively mixing together, in aqueous phase, manganese-(II) salts, hypochlorite and compounds producing an alkaline reaction, washing out precipitated manganese dioxide and drying it. More particularly, manganese dioxide with an apparent density of more than 0.8 gram/cubic centimeter is produced by using the starting materials in the quantitative ratio necessary to establish and maintain a pH-value higher than 8, during and following the precipitation, the pH-value selected being the higher the higher the apparent density of the resulting final product shall be. The resulting product, which may be predried if desired, is washed with a non-reducing acid at a pH-value of less than 2 until free from alkali, wash acid is removed, and the manganese dioxide is dried at temperatures between 100 and 350° C.

---

Figure 1:
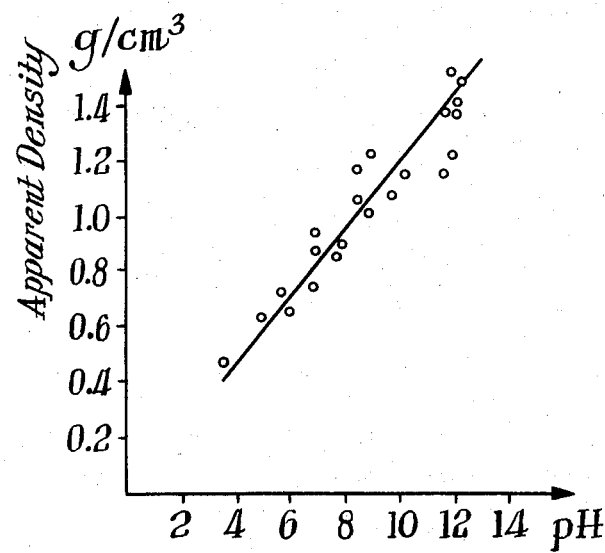

The present invention relates to a process for the manufacture of artificial manganese dioxide, which comprises intensively mixing together, in aqueous phase, manganese-(II) salts, hypochlorite and compounds producing an alkaline reaction, washing out precipitated manganese dioxide and drying it.

The term "manganese dioxide" as used herein means manganese oxides, in which the manganese has a mean valency of between 3 and 4 and which contain the manganese together with ions other than manganese ions, and water bound in different manner. Artificial manganese dioxide is manganese dioxide produced by purely chemical reactions.

To be suitable for use in batteries, the artificial manganese dioxide is required to have certain properties which, however, greatly depend on the conditions used in making it. By the use of a suitable process it is possible to produce artificial manganese dioxide with properties excelling those of natural manganese dioxide and partially excelling those of electrolytic manganese dioxide.

Various processes for making artificial manganese dioxide have already been described. A good deal of these processes use too costly oxidizing agents, for example permanganate, peroxo-compounds, chlorate and ozone, and accordingly produce too costly material. It is therefore good practice substantially to use pure oxygen or air, chlorine or hypochlorite for the oxidation of manganese-(II) compounds under commercial conditions.

German Pat. 1,205,067 describes a process for the manufacture of artificial manganese dioxide suitable for use in dry batteries, wherein a manganese-(II) and/or manganese-(III) salt solution is very rapidly and intensively mixed with a hypochlorite solution. The hypochlorite solution, which is added to the manganese salt solution, is used in an excess of between 1 and 25%, based on the quantity theoretically required, and it has an alkalinity, or it is given an alkalinity by means of alkalies and/or alkaline earths, which is necessary to establish and maintain a pH-value of less than 7, preferably between about 2 and 5, in the solution remaining behind, following the step of mixing the two solutions together and following precipitation of the manganese dioxide.

As taught in this earlier process the starting solution preferably in the manganese salt solution, which is introduced into a precipitation vessel and stirred therein, and the hypochlorite solution is added thereto and mixed therewith, if desired with the addition of alkalies and/or alkaline earths. As a result, the precipitation is found to take place in the agitator vessel within a pH-range of between 1 and 4, for example.

Inversely, use can be made of a starting material comprising a mixture of a hypochlorite solution with a sodium hydroxide solution, for example, and the manganese chloride solution can be added thereto. In this case, the pH value passes from about 14 to 4, during the precipitation.

In this latter case, relatively large proportions of foreign ions, for example alkali and chloride ions, which reduce the activity of the resulting product and are very difficult to remove therefrom by washing, are retained in the precipitate. This, however, can be avoided fairly extensively by very rapidly mixing the reaction solutions together, i.e. within a few seconds.

The activity of artificial manganese dioxide produced by this earlier process can be further increased by subjecting the precipitate washed out to prolonged extraction with large quantities of water containing little salt. The precipitation in the acid range yields products which have an apparent density of 0.25 gram/cubic centimeter (ground product) and a discharge capacity of 0.70 ampere-hours in so-called $R^6$-cells. $R^6$-cells are international standard cells with a diameter of 13.5 millimeters, a height of 50 millimeters, a volume of approximately 7 cubic centimeters and a weight of 15 grams.

In those cases in which the precipitation is effected predominantly in the alkaline range—this is the case if the starting solution is an alkaline hypochlorite solution—the resulting products have an apparent density of 0.62 gram/cubic centimeter (ground and compacted product) and a discharge capacity of 0.63 ampere-hours.

The manganese dioxides prepared by the two process variants described hereinabove are far from having the discharge capacity of between 0.85 and 0.90 ampere-hours demanded today of primary cells (for the continuous discharge of $R^6$-cells across a 25 ohm resistor) and they contain between about 10 and 15 percent of water.

It is an object of the present invention to provide a process comprising intensively mixing together, in aqueous phase, manganese-(II) salts, hypochlorite and compounds producing an alkaline reaction with the resulting formation of artificial manganese dioxide with an apparent density of more than 0.8 gram/cubic centimeter, which has a high concentration of active manganese dioxide therein and produces good discharge capacities in primary cells.

We have now unexpectedly discovered that the problem underlying our present invention is easy to solve by using the starting materials in the quantitative ratio necessary to establish and maintain a pH-value higher than 8, preferably between 8 and 11, during and following the precipitation of the manganese dioxide, the pH-value selected being the higher the apparent density of the resulting final product shall be. Following this, the resulting product, which may be predried if necessary or convenient, is washed out by means of a non-reducing acid at a pH-value of less than 2 until free from alkali, the wash acid is removed, and the manganese dioxide is finally dried at temperatures of between 100 and 350° C., preferably between 220 and 270° C.

In carrying out the process of the present invention, the manganese-(II) salt solution should preferably be poured into a strongly alkaline hypochlorite solution.

In accordance with a further preferred feature of the process of the present invention, the manganese dioxide precipitate, which has been filtered off, should first be predried at temperatures between 100 and 250° C., preferably between 180 and 220° C., then washed at a pH-value of less than 2 with a non-reducing acid until free from alkali and, following the removal of the wash acid, it should be dried again, at temperatures between 100 and 350° C. The hypochlorite should preferably be used in approximately stoichiometric proportions, based on the quantity necessary to effect the formation of manganese dioxide. The step of washing the precipitated matter with a non-reducing acid, which may be sulfuric acid or nitric acid, should most conveniently be carried out at temperatures lower than 60° C., more preferably at room temperature. It is equally advantageous to precipitate the manganese dioxide approximately at room temperature.

It could not be foreseen that relationship does in fact exist between the apparent density of manganese dioxide produced by the precipitation with hypochlorite and the pH-value of the solution, in which the precipitation is effected. This relation is shown diagrammatically in FIG. 1 of the accompanying drawings. As can be seen, it is possible to produce manganese dioxide of high apparent density at high pH-values. While the products so made contain alkali or alkaline earth ions in quantities proportional to the pH-value selected, which affect the discharge capacity, the fact remains that these can be replaced by $H^+$-ions by subjecting the precipitate to treatment with a non-reducing acid, e.g. sulfuric acid or nitric acid. The apparent density of the finished product is merely reduced by about 0.2 gram/cubic centimeter, provided that the acid treatment is carried out at room temperature. The use of higher temperatures may be found to further reduce the apparent density, for example at the rate of 0.5 gram/cubic centimeter, at 70° C. The relations between the pH-value and apparent density have more particularly been found to exist when the manganese salt solution and hypochlorite solution are mixed together with thorough agitation, for example in the manner described in German Pat. 1,205,067. The precipitation temperature is not critical. Preferably, however, the precipitation should be effected at room temperature or at temperatures slightly above room temperature. Less accurate results and always lower apparent densities are obtained in all those cases in which the solutions are slowly mixed together.

Figure 2:
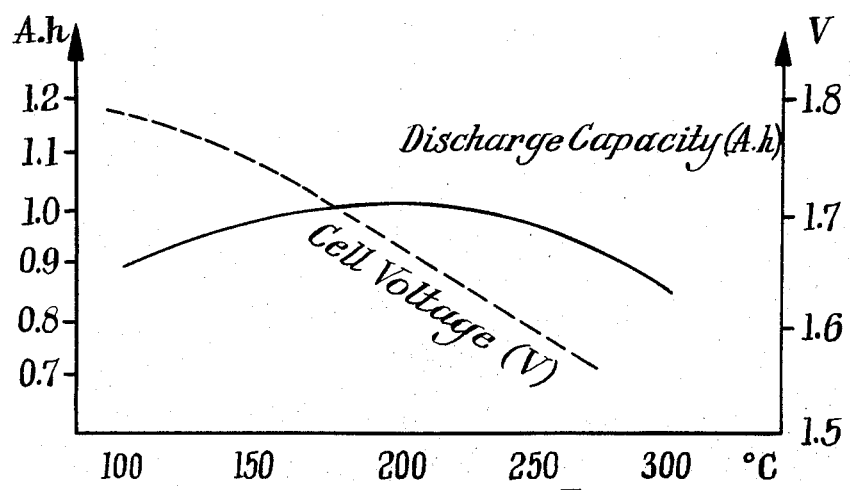

The products so made still contain considerable proportions of water of constitution and they contain correspondingly less active manganese dioxide. They are therefore dried at temperatures up to 350° C. As a result, the discharge capacity is increased and the voltage of primary cells made with the manganese dioxide of the present invention is simultaneously lowered to the generally required standard value of approximately 1.60 volts. This is shown diagrammatically in FIG. 2 of the accompanying drawings.

FIG. 3 is a representation of the discharge curves of manganese dioxide produced in accordance with this invention, which are compared with the discharge curve of commercial manganese dioxide produced in conventional manner from a manganese-(II) salt solution and hypochlorite.

In accordance with the present invention, it is possible in various ways to effect the precipitation in alkaline medium, and in various ways to combine the acid treatment and drying with the precipitation, without departing from the scope of the present invention. The following examples are intended to illustrate some possible combinations.

EXAMPLE 1

1.5 liters of a manganese sulfate solution containing 87 grams of manganese per liter were added, within 10 minutes, to 12 liters of a solution, which contained 190 grams of sodium hydroxide and 175 grams of active chlorine in the form of sodium hypochlorite, and the two solutions were mixed together by means of a high speed agitator. The pH-value was at least 8, at the end of the reaction. The resulting precipitate was filtered off, washed and predried at 200° C. The product so obtained was ground to give particles with a size of less than 160 μm., suspended for 2 hours in 1N-sulfuric acid, filtered and washed. Following this, the product was dried at 250° C. It had an apparent density of 0.95 gram/cubic centimeter.

EXAMPLE 2

The same quantities of solution as those used in Example 1 were reacted under the conditions reported in the preceding example. The resulting reaction product was filtered, dried and ground. Following this, it was stirred together with dilute nitric acid at 70° C. and for a period of 3 hours, filtered, washed until neutral and dried at 210° C. It had an apparent density of 0.85 gram/cubic centimeter.

EXAMPLE 3

The starting solution (12 liters) was a manganese sulfate solution which contained a total of 139 grams of manganese. A sodium hydroxide solution was added thereto in the quantity necessary to transform all of the manganese to maganese hydroxide and to establish a pH-value of 12, in the suspension. A quantity of sodium hypochlorite solution, corresponding to the quantity of manganese used, was metered thereinto with vigorous agitation. The resulting precipitate of manganese dioxide was treated in the manner reported in Example 1. The product so made had an apparent density of 1.20 grams/cubic centimeter.

EXAMPLE 4

Manganese dioxide was precipitated in the manner described in Examples 1 to 3. Filtration was omitted and the suspension was immediately acidified with sulfuric acid so as to establish a pH-value of 0, and stirred for 2 hours. Following this, the precipitated matter was filtered off, washed until free from acid and dried at 285° C. The resulting product had an apparent density of between 0.9 and 1.2 grams/cubic centimeter.

We claim:

1. In a process for the manufacture of artificial manganese dioxide by intensively mixing together, in aqueous phase, starting materials comprised of manganese-(II) salts, hypochlorite and compounds producing an alkaline reaction, washing out precipitated manganese dioxide and drying it, the improvement which comprises producing manganese dioxide with an apparent density of more than 0.8 gram/cubic centimeter by using the starting materials in the quantitative ratio necessary to establish and maintain a pH-value higher than 8, during and following the precipitation, the higher the pH-value selected the higher is the desirable apparent density of the resulting final product; filtering the precipitated product, washing the product with sulfuric or nitric acid at a pH-value of less than 2 until free from alkali; removing the wash acid; and drying the manganese dioxide at temperatures between 100 and 350° C.

2. The process as claimed in claim 1, wherein the starting materials are used in the quantitative ratio necessary to establish a pH-value of between 8 and 11.

3. The process as claimed in claim 1, wherein the manganese dioxide is dried at temperatures between 200 and 270° C.

4. The process as claimed in claim 1, wherein the manganese-(II) salt solution is poured into an alkaline hypochlorite solution.

5. The process as claimed in claim 1, wherein the manganese dioxide precipitated and filtered off is first predried at temperatures between 100 and 250° C., then washed at a pH-value of less than 2 with sulfuric or nitric acid until free from alkali and, following the removal of the wash acid, dried again at temperatures between 100 and 350° C.

6. The process as claimed in claim 5, wherein the manganese dioxide precipitated and filtered off is first predried at temperatures between 180 and 200° C. and then washed with the sulfuric or nitric acid.

7. The process as claimed in claim 1, wherein the hypochlorite is used in approximately stoichiometric proportions, based on the quantity necessary for the formation of the manganese dioxide.

8. The process as claimed in claim 1, wherein the precipitated manganese dioxide is washed with the sulfuric or nitric acid at a temperature lower than 60° C.

9. The process as claimed in claim 8, wherein the washing step is effected at room temperature.

10. The process as claimed in claim 1, wherein the manganese dioxide is precipitated approximately at room temperature.

References Cited
FOREIGN PATENTS 1,205,067  11/1965  Germany _____ 23—145

OSCAR R. VERTIZ, Primary Examiner

H. S. MILLER, Assistant Examiner